United States Patent
Porskrog et al.

(10) Patent No.: US 9,725,113 B2
(45) Date of Patent: Aug. 8, 2017

(54) HYDRAULIC STEERING SYSTEM

(71) Applicant: Danfoss Power Solutions ApS, Nordborg (DK)

(72) Inventors: Bendt Porskrog, Nordborg (DK); Casper Mikael Olesen, Sonderborg (DK); Abdul Karim Rahimzai, Sonderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 0 days.

(21) Appl. No.: 15/147,516

(22) Filed: May 5, 2016

(65) Prior Publication Data

US 2016/0332663 A1      Nov. 17, 2016

(30) Foreign Application Priority Data

May 13, 2015   (EP) .................................. 15167583

(51) Int. Cl.
| | | |
|---|---|---|
| *B62D 5/06* | (2006.01) | |
| *B62D 5/065* | (2006.01) | |
| *B62D 5/093* | (2006.01) | |
| *B62D 5/12* | (2006.01) | |

(52) U.S. Cl.
CPC ............ *B62D 5/065* (2013.01); *B62D 5/062* (2013.01); *B62D 5/093* (2013.01); *B62D 5/12* (2013.01)

(58) Field of Classification Search
CPC .................. B62D 5/06; B62D 5/065
See application file for complete search history.

(56) References Cited

U.S. PATENT DOCUMENTS

| | | | |
|---|---|---|---|
| 4,011,721 A | 3/1977 | Yip | |
| 9,242,668 B2 * | 1/2016 | Ennemark | B62D 5/093 |
| 9,550,521 B2 * | 1/2017 | Andersen | B62D 5/093 |
| 2014/0374187 A1 * | 12/2014 | Arbjerg | B62D 5/093 |
| | | | 180/441 |
| 2016/0298658 A1 * | 10/2016 | Liljenberg | F15B 11/08 |

FOREIGN PATENT DOCUMENTS

| | | | |
|---|---|---|---|
| DE | 101 64 392 A1 | 7/2003 | |
| DK | EP 2127998 A1 * | 12/2009 | ............ B62D 5/061 |
| EP | 2 610 141 A1 | 7/2013 | |
| WO | 2004/043768 A1 | 5/2004 | |

* cited by examiner

*Primary Examiner* — Kevin Hurley
(74) *Attorney, Agent, or Firm* — McCormick, Paulding & Huber LLP

(57) ABSTRACT

A hydraulic steering system (1) is described comprising a steering unit (3) and a pressure source (4), said steering unit (3) comprising a working port arrangement (L, R) having two working ports, a supply port arrangement having a high pressure port (P) and a low pressure port (5), a main flow path (7) having a main bleed (A1) and a metering device (8) and being arranged between said high pressure port (P) and said working port arrangement (L, R), an amplification flow path (9) having an amplification bleed (Au) and being arranged between said high pressure port (P) and said working port arrangement (L, R), said main bleed (A1) and said amplification bleed (Au) being controlled together by means of a steering handle (6) and being closed in neutral position of said steering handle, and said pressure source (4) having a variable displacement.

20 Claims, 1 Drawing Sheet

HYDRAULIC STEERING SYSTEM

CROSS REFERENCE TO RELATED APPLICATION

Applicant hereby claims foreign priority benefits under U.S.C. §119 from European Patent Application No. EP15167583 filed on May 13, 2015, the content of which is incorporated by reference herein.

TECHNICAL FIELD

The present invention relates to a hydraulic steering system.

BACKGROUND

Such a steering system is used to steer a vehicle. In most cases a steering wheel which serves as a steering handle is connected to a steering unit of the steering system. When the steering wheel is actuated, the hydraulic steering unit supplies hydraulic fluid under pressure to a steering motor. The steering motor moves steered wheels of the vehicle so that the vehicle can change its moving direction.

SUMMARY

The object underlying the invention is to enable comfortable, in particular amplified and/or variable, steering.

This object is solved with a hydraulic steering system comprising a steering unit and a pressure source, said steering unit comprising a working port arrangement having two working ports, a supply port arrangement having a high pressure port and a low pressure port, a main flow path having a main bleed and a metering device and being arranged between said high pressure port and said working port arrangement, an amplification flow path having an amplification bleed and being arranged between said high pressure port and said working port arrangement, said main bleed and said amplification bleed being controlled together by means of a steering handle and being closed in neutral position of said steering handle, and said pressure source has a variable displacement.

Such a steering system combines an integrated amplification function and a steering valve of closed center type. Such a steering unit makes it possible to have a first displacement in manual steer mode meaning without pump supply and a second displacement in normal steer mode meaning with pump supply. The first displacement can be much lower than the second displacement facilitating steering of the vehicle when a pump failure occurs. In normal steer mode the amplification is active: part of the hydraulic fluid is metered through the metering device, another part of the hydraulic fluid is bypassing the gear set of the metering device. The fluid flow through the amplification flow path is proportional or progressive to the flow through the main flow path thereby allowing an amplification of the total flow. This has the advantage that in undisturbed or normal steer mode the amplification is active and therefore only small actuations of the steering wheel or steering handle are necessary to have even large steering movements of the steering motor, whereas in a disturbed or emergency mode the metering device can be used as pump having a relatively low displacement.

Preferably said pressure source is pressure controlled. It builds up a pressure to a certain level determined by the pump pressure control, and keeps the pressure by controlling the output flow of hydraulic fluid. When the steering unit is in neutral position, the main bleed and the amplification bleed are closed and no flow of hydraulic fluid can stream through the steering unit. So the pressure source, in most cases a pump, will generate no flow.

In a preferred embodiment a torque compensator is provided establishing a pressure differential over said amplification flowpath to be the same as a pressure differential over said main flowpath. When the same pressure drop or pressure differential across the amplification flow path and across the main flow path is established, it can be secured that the amplification ratio between the main flow path and the amplification flow path will be constant even if a pressure drop occurs, for example at the metering device due to dirt particles or the like.

Preferably said torque compensator is formed by an adjustable flow resistance in said amplification flow path. When the flow resistance in the main flow path increases the adjustable flow resistance in the amplification flow path is adjusted accordingly. This is a simple way to achieve the same pressure differential or pressure drop in both flow paths.

Preferably said adjustable flow resistance is adjusted by a pressure in said main flow path. Such a pressure is in all cases available and can be used in a simple way to adjust the flow resistance in the amplification flow path.

Preferably said torque compensator comprises a check valve opening in a direction towards a point downstream said metering device. In this way the torque compensator is used for an additional function. It blocks the amplification flow path in case of an emergency steering. No further elements are necessary in the amplification flow path to fulfill this function.

Preferably an emergency check valve is arranged between said low pressure port and a point upstream said amplification bleed. This emergency check valve again is used in an emergency steering mode. It allows a fluid flow circulating through the main flow path and the steering motor. Further, it is possible that hydraulic fluid is sucked from the low pressure port if necessary.

In a preferred embodiment a steering motor is connected to said working port arrangement. This steering motor receives hydraulic fluid under pressure from the steering unit and is therefore able to move or pivot the steered wheels.

BRIEF DESCRIPTION OF THE DRAWINGS

A preferred embodiment of the invention is now described in more detail with reference to the drawing, wherein.

DETAILED DESCRIPTION

Figure 1:
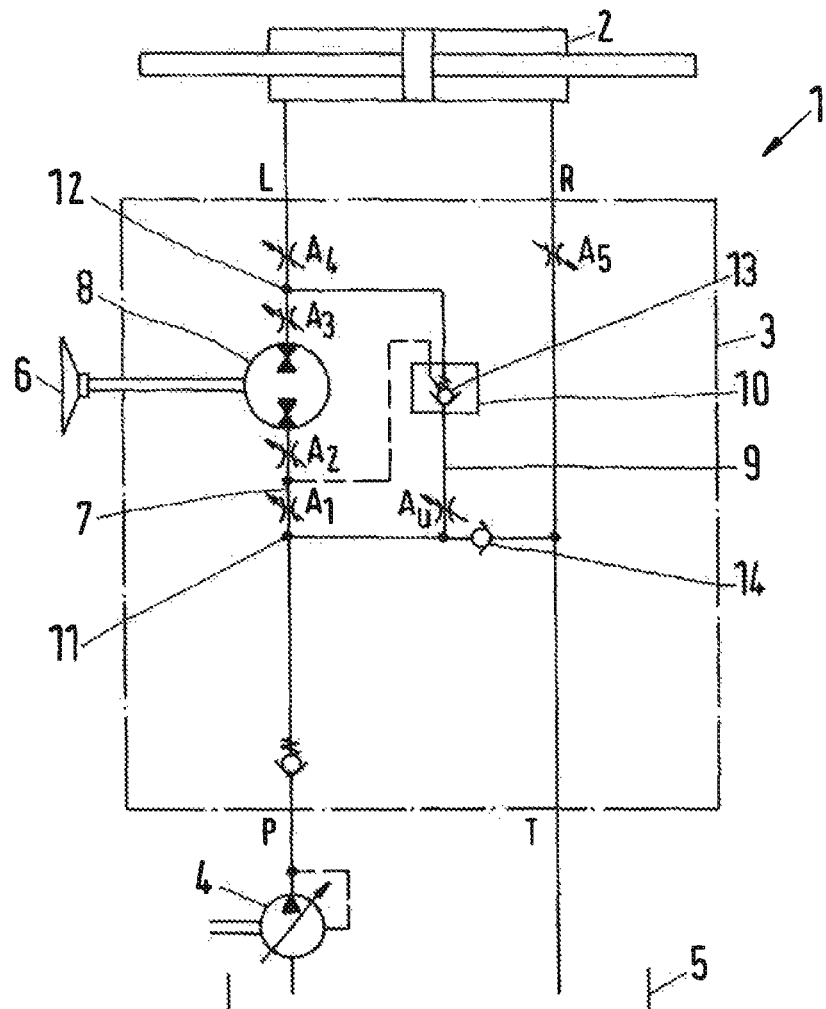
FIG. 1 is a schematic illustration of a steering system.

FIG. 1 shows schematically a hydraulic steering system 1 which comprises a steering motor 2, a steering unit 3, a pump 4 or any other pressure source, and a tank 5.

A steering wheel 6 is connected to the steering unit 3. However, any other kind of steering handle can be used instead of the steering wheel 6.

The steering unit 3 comprises a working port arrangement having two working ports L, R connected to said steering motor 2, a supply port arrangement having a high pressure port P and a low pressure port T.

The steering unit 3 comprises a main flow path 7 in which a metering device 8 is located. The metering device 8 is connected in series with a main bleed A1 and other bleeds A2, A3. Furthermore, depending on a steering direction, the metering device 8 is connected with bleed A4 for the left working port L or for the right working port R. The other one of these two working ports R, L is connected to low pressure port T via bleed A5.

An amplification flow path 9 is connected parallel to a part of the main flow path 7. An amplification bleed Au is located in the amplification flow path 9. Furthermore, a torque compensator 10 is connected in series with the amplification bleed Au.

The amplification flow path 9 is connected to a point 11 upstream the main bleed A1. Furthermore, the amplification flow path 9 is connected to a point 12 between bleed A3 and bleed A4. In other words, the amplification flow path 9 is basically arranged in parallel to the main flow path 7.

The torque compensator comprises a check valve 13 opening in the direction to point 12 between bleeds A3 and A4.

An emergency check valve 14 connects a low pressure port T with point 11 upstream the main bleed A1 and the amplification bleed Au.

Figure 2:
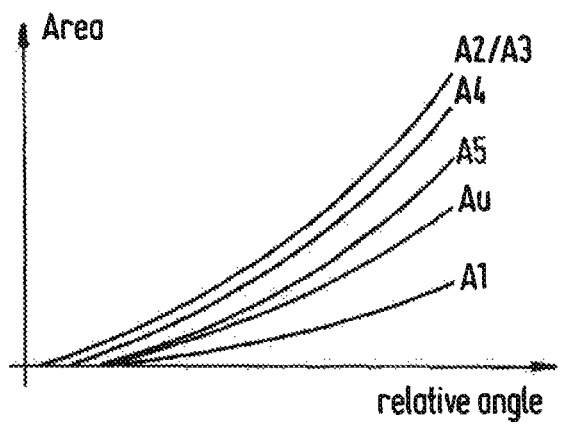
FIG. 2 shows the opening behavior of the bleeds of a steering unit of the steering system.

The bleeds A1-A5 and Au are formed between a spool and a sleeve (not shown). One of spool and sleeve is connected to the steering wheel 6 and the other of spool and sleeve is connected to the metering device 8. When the spool and the sleeve are rotated relative to each other because of an actuation of the steering wheel 6, the bleeds A1-A5, Au open, i. e. they increase an area through which hydraulic fluid can flow. The opening and closing characteristics of the bleeds A1-A5 and Au are schematically shown in FIG. 2.

At a relative angle of 0° between spool and sleeves the bleeds A1-A5 and Au are closed. The pump 4 has a variable displacement and is pressure controlled: it builds up pressure to a certain level determined by the pump pressure control, and keeps the pressure by controlling the output flow. When the steering unit 3 is in neutral position, the main bleed 1 and the amplification bleed Au are closed and no flow of hydraulic fluid can stream through the steering unit 3. Consequently the pump 4 will generate no flow.

When turning the steering wheel 6, the main bleed A1, the amplification bleed Au and the other bleeds A2-A5 gradually will open in parallel over the entire control range: relative angle spool to sleeve from 0° to full deflection is normally 15°. The opening area will depend on steering speed.

The flow of hydraulic fluid across the main bleed A1 is determined by the size of the metering device 8 and the speed of the steering wheel 6. The flow of hydraulic fluid across the amplification bleed Au is determined by the opening area of the amplification bleed Au. Pressure drop across the main bleed A1 and the amplification bleed Au will be the same, and so the amplification will be constantly independent on steering speed under normal steering conditions. The pump 4 must as minimum be able to supply the requested flow and pressure for the steering movement.

All hydraulic fluid supplied to the high pressure port P by the pump 4 will be split between the parallel connected variable bleeds A1 and Au.

When the steering motor 2 has moved to end stroke or when pressure demand is higher than setting of the pressure control of the pump 4 and the steering wheel 6 is still turned, the spool/sleeve set will be forced into maximum deflection, but due to no flow demand, the pump flow will decrease and will only generate flow to compensate for internal leakage.

The torque compensator 10 will secure the same pressure drop across the amplification path 9 (amplification bleed Au and torque compensator 10) and main flow path 7 (main bleed A1, bleeds A2, A3, metering device 8). In case pressure drop may occur across the metering device 8, e. g. due to dirt particles entering the steering unit, the torque compensator 10 will generate the same pressure drop for the amplified hydraulic fluid. In this way the amplification ratio will remain constant.

As mentioned above, the torque compensator 10 comprises a check valve 13 opening in a direction from point 11 to point 12. The check valve 13 is loaded in closing direction by a pressure between main bleed A1 and bleed A2, in other words by a pressure downstream the main bleed A1.

When the pressure at the high pressure port P does not match the steering pressure requested, the metering device 8 will act as a pump, when torque is applied to the steering wheel 6. The displacement for emergency steering is purely determined by the size of the metering device 8. The check valve function of the torque compensator 10 will prevent back stream of hydraulic fluid across the amplification bleed Au.

When pump flow becomes insufficient, the emergency steering check valve 14 will open and hydraulic fluid will be led to the metering device 8 from return side of steering motor 2. Additional flow of hydraulic fluid can be sucked from the low pressure port T as needed.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering system comprising a steering unit and a pressure source, said steering unit comprising a working port arrangement (L, R) having two working ports, a supply port arrangement having a high pressure port (P) and a low pressure port, a main flow path having a main bleed (A1) and a metering device and being arranged between said high pressure port (P) and said working port arrangement (L, R), an amplification flow path having an amplification bleed (Au) and being arranged between said high pressure port (P) and said working port arrangement (L, R), said main bleed (A1) and said amplification bleed (Au) being controlled together by means of a steering handle and being closed in neutral position of said steering handle, and said pressure source having a variable displacement.

2. The hydraulic steering system according to claim 1, wherein said pressure source is pressure controlled.

3. The hydraulic steering system according to claim 1, wherein a torque compensator is provided establishing a pressure differential over said amplification path to be the same as a pressure differential over said main flow path (A1, A2, A3).

4. The hydraulic steering system according to claim 3, wherein said torque compensator is formed by an adjustable flow resistance in said amplification flow path.

5. The hydraulic steering system according to claim 4, wherein said adjustable flow resistance is adjusted by a pressure in said main flow path.

6. The hydraulic steering system according to claim 3, wherein said torque compensator comprises a check valve opening in a direction towards a point downstream said metering device.

7. The hydraulic steering system according to any of claim 1, wherein an emergency check valve is arranged between said low pressure port (T) and a point upstream said amplification bleed (Au).

8. The hydraulic steering system according to claim 1, wherein steering motor is connected to said working port arrangement (L, R).

9. The hydraulic steering system according to claim 2, wherein a torque compensator is provided establishing a pressure differential over said amplification path to be the same as a pressure differential over said main flow path (A1, A2, A3).

10. The hydraulic steering system according to claim 4, wherein said torque compensator comprises a check valve opening in a direction towards a point downstream said metering device.

11. The hydraulic steering system according to claim 5, wherein said torque compensator comprises a check valve opening in a direction towards a point downstream said metering device.

12. The hydraulic steering system according to claim 2, wherein an emergency check valve is arranged between said low pressure port (T) and a point upstream said amplification bleed (Au).

13. The hydraulic steering system according to claim 3, wherein an emergency check valve is arranged between said low pressure port (T) and a point upstream said amplification bleed (Au).

14. The hydraulic steering system according to claim 4, wherein an emergency check valve is arranged between said low pressure port (T) and a point upstream said amplification bleed (Au).

15. The hydraulic steering system according to claim 5, wherein an emergency check valve is arranged between said low pressure port (T) and a point upstream said amplification bleed (Au).

16. The hydraulic steering system according to claim 6, wherein an emergency check valve is arranged between said low pressure port (T) and a point upstream said amplification bleed (Au).

17. The hydraulic steering system according to claim 2, wherein a steering motor is connected to said working port arrangement (L,R).

18. The hydraulic steering system according to claim 3, wherein a steering motor is connected to said working port arrangement (L,R).

19. The hydraulic steering system according to claim 4, wherein a steering motor is connected to said working port arrangement (L,R).

20. The hydraulic steering system according to claim 5, wherein a steering motor is connected to said working port arrangement (L,R).

* * * * *